Figure 1:
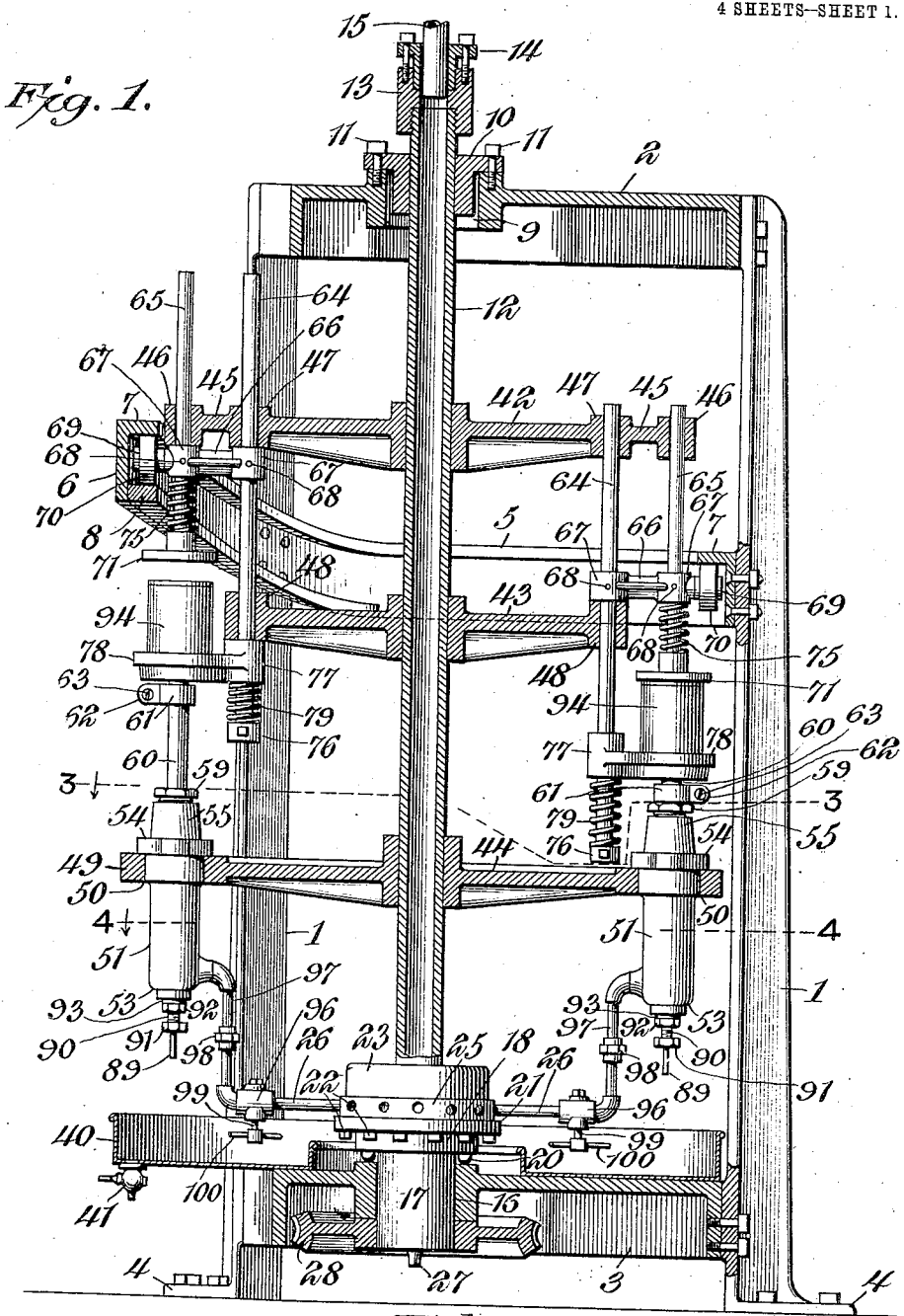

W. J. PHELPS.
CAN FILLING APPARATUS.
APPLICATION FILED OCT. 4, 1911.

1,058,095.

Patented Apr. 8, 1913.
4 SHEETS—SHEET 1.

Witnesses
Howard D. Orr.
F. T. Chapman

Walter J. Phelps, Inventor,
By E. G. Siggers.
Attorney

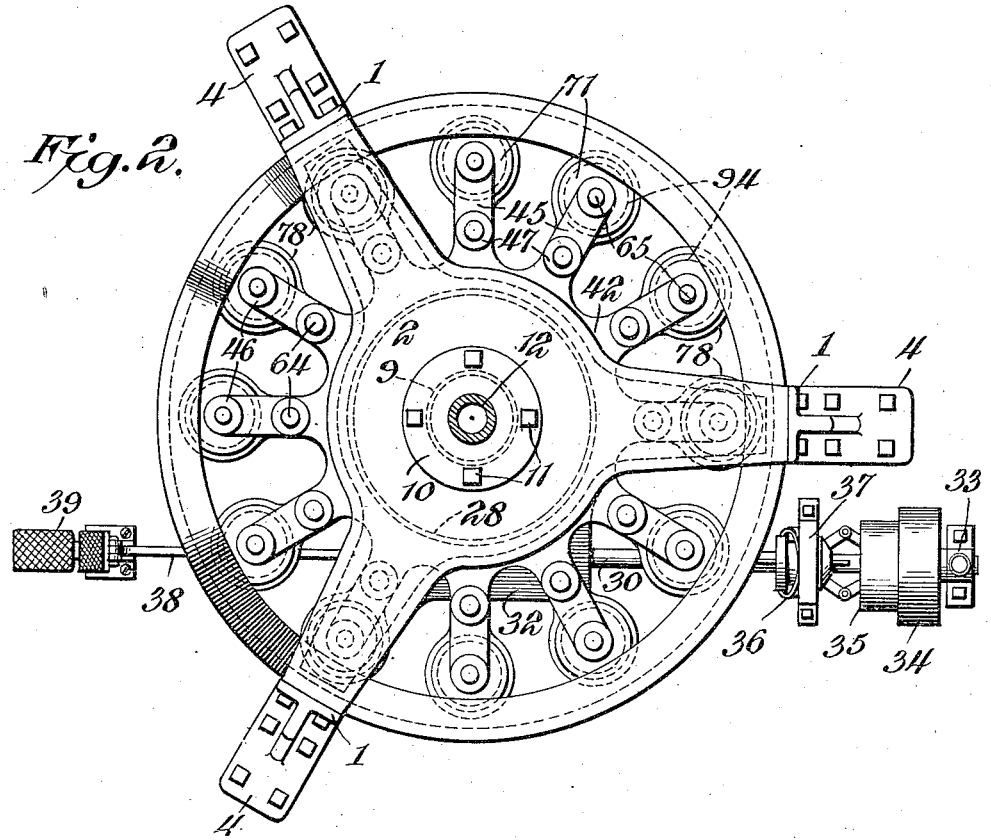
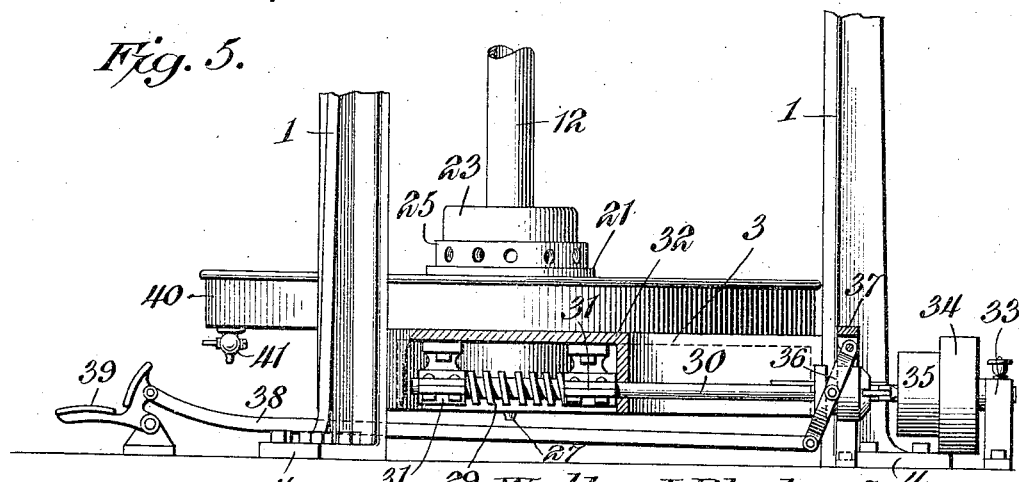

W. J. PHELPS.
CAN FILLING APPARATUS.
APPLICATION FILED OCT. 4, 1911.
1,058,095.
Patented Apr. 8, 1913
4 SHEETS—SHEET 3.
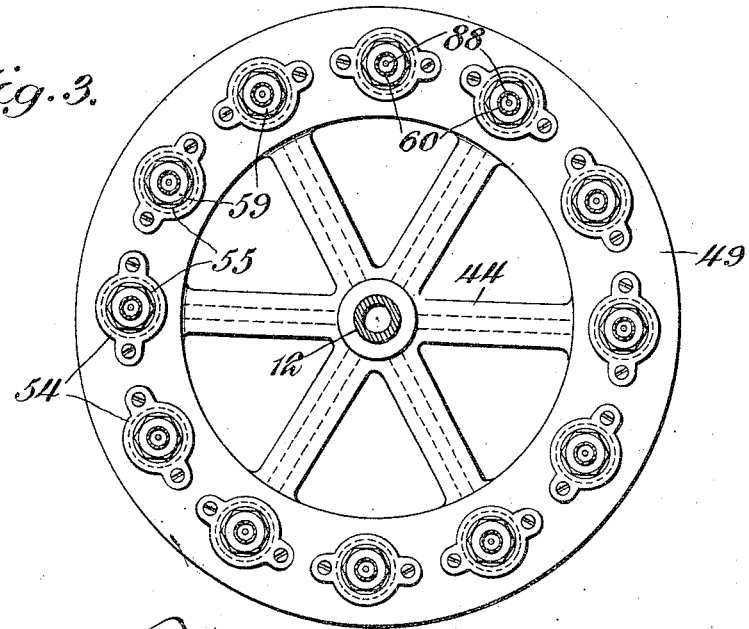
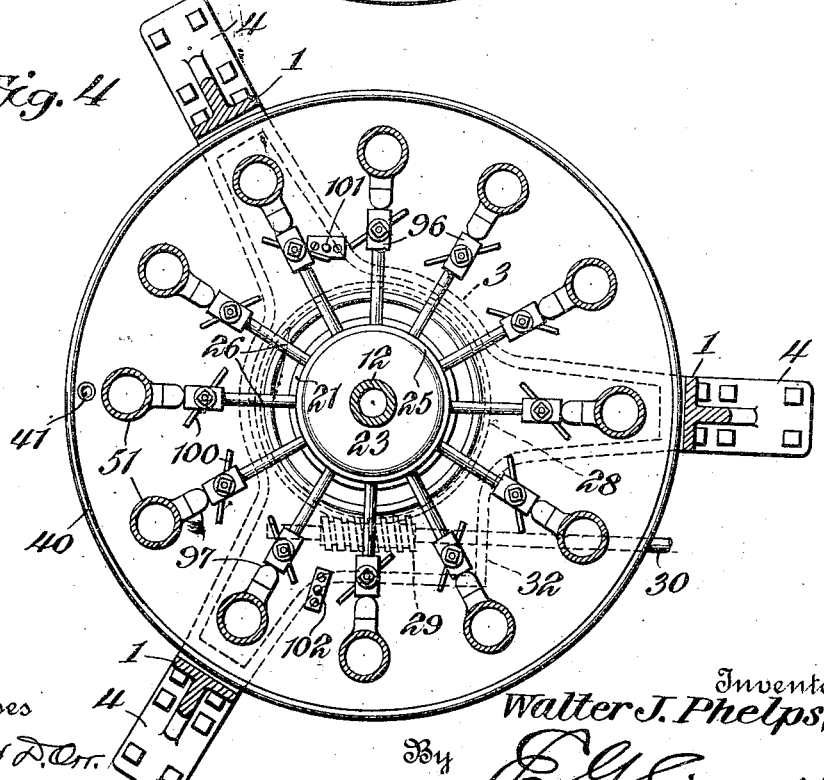
Witnesses
Howard D. Orr.
F. T. Chapman.
Inventor,
Walter J. Phelps,
By E. G. Siggers
Attorney

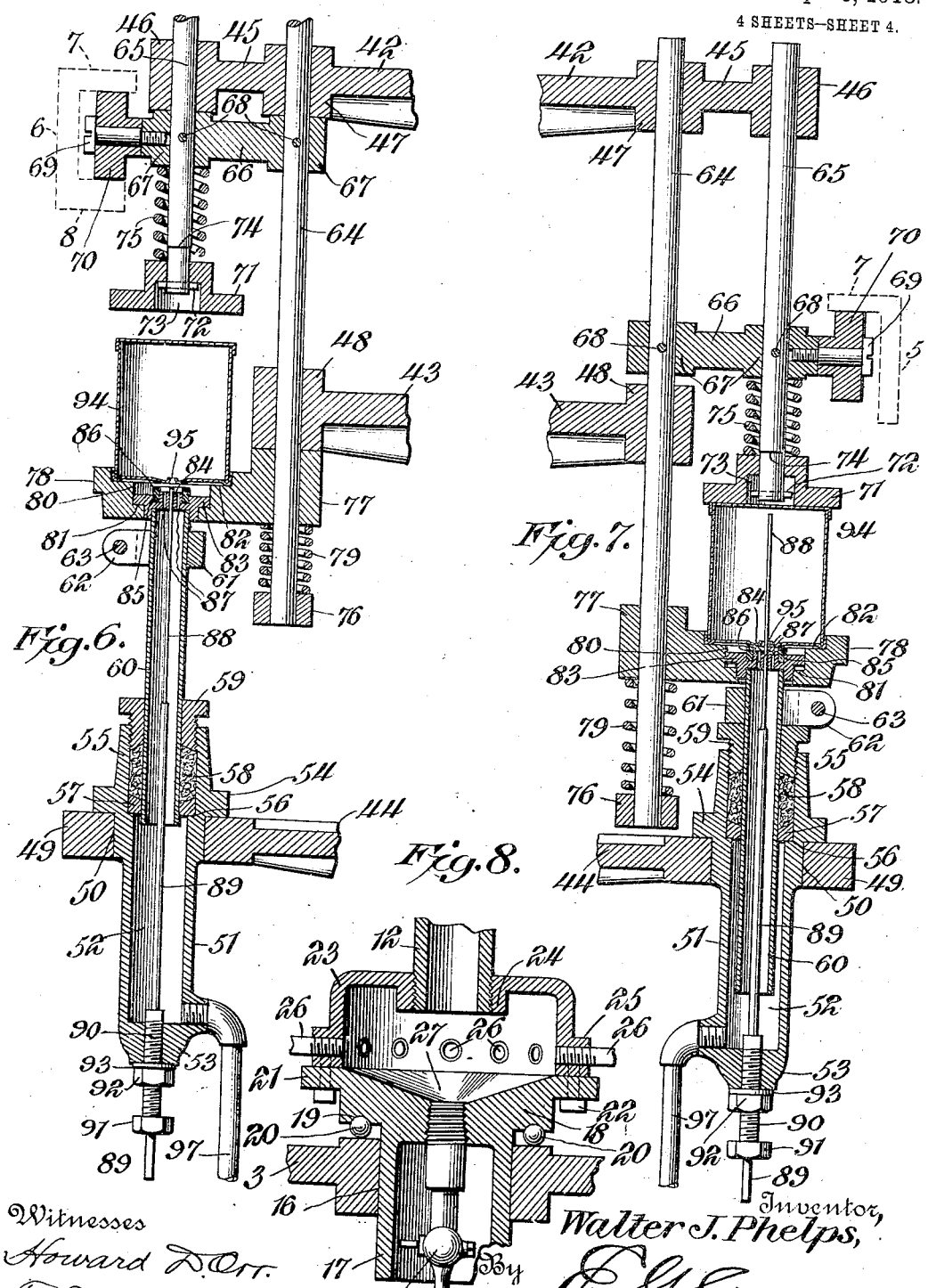

UNITED STATES PATENT OFFICE.

WALTER J. PHELPS, OF BALTIMORE, MARYLAND, ASSIGNOR OF ONE-HALF TO FRANK GEBBIE, OF ROCHESTER, NEW YORK.

CAN-FILLING APPARATUS.

1,058,095.  Specification of Letters Patent.  Patented Apr. 8, 1913.

Application filed October 4, 1911. Serial No. 652,863.

*To all whom it may concern:*

Be it known that I, WALTER J. PHELPS, a citizen of the United States, residing at Baltimore, State of Maryland, have invented a new and useful Can-Filling Apparatus, of which the following is a specification.

This invention has reference to can filling apparatus and is designed more particularly for filling cans with evaporated milk, although not confined to the use of such commodity, for said apparatus may be used for filling other commodities into cans.

Since the invention is especially adapted for operation in connection with evaporated milk, to simplify the description it will be considered throughout this specification that the commodity employed is evaporated milk, but it will be understood that by confining the description to the one commodity the use of the apparatus in so far as it may be applied to other commodities is not thereby limited solely to the use of evaporated milk.

For manufacturing reasons, and especially because in the packaging of evaporated milk by placing the same in metal cans for storage, transportation and sale, it is found to be particularly advantageous to provide cans wholly sealed before the milk is introduced with the exception of a small centrally located filling perforation in one end or head, and since this filling perforation is afterward sealed while the perforated end of the can is uppermost such perforated head or end of the can may for convenience of description be termed the top of the can.

In introducing the milk into the can through the small perforation employed certain difficulties have heretofore been encountered, which difficulties are set forth in my application No. 634,052, filed June 19, 1911, for can filling apparatus, and in such application there is disclosed an apparatus designed particularly for introducing the milk into the cans when the latter are in the inverted position, that is, with the perforated end downward, so that the milk on entering the can must rise through the accumulating milk within the can, while the air displaced by the accumulating milk finds escape through an air conduit of minute cross section introduced into the can through the perforation therein until close to the closed end of the can. The purpose of so arranging the cans and the filling devices is to prevent what is known as foaming of the milk when introduced under a sufficient head to cause the filling of the cans with the requisite rapidity to meet commercial conditions, both as to the consumption of time and the cost of the necessary machinery, power and labor.

While the general principle upon which the machine of the present invention operates is substantially the same as that of the machine of the aforesaid application, the structure of the machine of the present application is in certain respects quite different from that disclosed in the said application, and certain features which in the use of the machine of the aforesaid application might prove in practice to be more or less defective, though not necessarily vitally so, are so changed in the machine of the present invention that the likelihood of defective action is wholly eliminated.

The single filling orifice in each can is purposely made of as small diameter as practical, and in practice the diameter of the orifice need not exceed 89 thousandths of an inch and may be even considerably less. This orifice must not only accommodate an air tube, but must provide room enough about the air tube for the inflow of the milk with such rapidity as to fill the can in a reasonably short time. It results, therefore, that the air tube is also of very small diameter, and such diameter must be materially less than 89 thousandths of an inch if the diameter of the orifice be 89 thousandths of an inch, and if the diameter of the orifice be less than that, the tube must be correspondingly smaller in external diameter. Such a tube is, of course, quite fragile, but in the structure of the present invention the tube of such small diameter may be comparatively short, not much exceeding the depth of the can to be filled, although the machine is so made as to fill cans of commercial sizes used for the reception of evaporated milk where the economy of sealing makes it expedient to use cans having minute filling orifices.

Moreover, the present invention contemplates certain improvements in the general structure of the machine whereby the parts are simplified and the cleansing of the machine is greatly facilitated, it being necessary to thoroughly cleanse each machine after each day's work, so that there may be no possibility of contamination of subsequent quantities of milk passed through the machine.

The invention will be best understood from a consideration of the following detailed description, taken in connection with the accompanying drawings forming a part of this specification, with the understanding, however, that while in the drawings there is shown a commercial type of machine which in actual practice has proven to be effective, the invention is by no means limited to any exact conformity to the structure shown in the drawings, but may be variously changed and modified so long as the salient features of the invention are retained and the results aimed at are accomplished.

In the drawings:—Figure 1 is a vertical diametric section through a machine embodying the present invention, some parts being shown in elevation, and some distant parts omitted. Fig. 2 is a plan view of the machine shown in Fig. 1 with the central milk inlet or conduit indicated in cross section. Fig. 3 is a section on the line 3—3 of Fig. 1 distant parts being omitted. Fig. 4 is a section on the line 4—4 of Fig. 1. Fig. 5 is a detail elevation, partly in section, of the lower end of the machine showing controllable driving means. Fig. 6 is a vertical section with some parts in elevation and drawn to a larger scale than the preceding views of one of the can holding means and the filling devices immediately associated therewith, the structure being shown in one phase of the operation. Fig. 7 is a view similar to Fig. 6 but showing another phase of the operation and the section being taken through another portion of the machine, similar to that shown in Fig. 6, where the parts have in the operation of the machine reached the position shown. Fig. 8 is a vertical diametric section through the milk distributing chamber and adjacent parts.

Referring to the drawings, there is shown a main frame composed of legs 1, preferably, though not necessarily, three in number, united at the upper end by a spider 2, and near the lower end by another spider 3, the several parts of the frame being preferably of web and flange construction, and the legs 1 terminating in feet 4 designed to rest upon a supporting surface, such as a floor and to be bolted thereto.

At an appropriate point in the height of the legs 1 there is secured a cam ring 5, which is substantially circular in plan view and through the greater portion of its length is in one plane, and at another portion 6 this cam ring is elevated with reference to the plane of the major portion of the ring. The cam ring may be formed of angle material with a top web 7 directed toward the center line of the frame and at the rising portion 6 the lower portion of the cam ring is provided with a web 8 which constitutes a track for a purpose which will hereinafter appear.

At the center of the spider 2 there is provided a flanged opening 9 in which is seated a bearing block 10 secured to the flanged portion of the web by suitable screws 11 or otherwise. This bearing block is traversed by an upright hollow shaft 12 extending above the block 10 and there terminating in a threaded end entering a coupling block 13, which at the end remote from the shaft 12 receives a packing gland 14 about a pipe or tube 15 which may come from a suitable supply of evaporated milk preferably located at a height to impart to the milk the requisite head for the purposes of the invention. For instance, if the machine be located in a building consisting of several stories, the milk supply or reservoir may be located one or two or more stories above the machine, according to the height of the stories. The spider 3 is also provided at the center with a flanged opening 16 through which there is passed a hollow extension 17 terminating above the spider 3 in a laterally expanded head 18 on the under side of which may be formed a ball raceway 19 containing balls 20 resting on the upper edge of the flange surrounding the opening 16, so that the head 18 with its extension 17 may be free to rotate, the said head 18 constituting a step bearing. The upper marginal portion of the head 18 is provided with a radial flange 21 upon which rests, and to which is secured by bolts 22 the marginal portion of an inverted cup 23 which in turn receives centrally the lower end of the hollow shaft 12, which latter may be screwed into the cup 23 and extend through an opening in the center thereof formed by a flange 24. The peripheral portion of the cup 23 is thickened to form a marginal rib 25 through which extend an appropriate number of pipes 26 threaded into the rib 25 and opening into the interior of the cup. The upper surface of the head 18 is dished, as indicated at 27, and coacts with the interior of the cup 23 to form a distributing chamber into which milk is fed by the hollow or tubular shaft 12 and passes out therefrom through the pipes 26.

A drain cock 27 communicates with the interior of the chamber within the cup 23 at the lower end of the dished portion 27 of the head 18 and discharges through the extension 17, which latter constitutes a guide bearing for the head 18. The extension 17 has secured thereto below the flanged opening 16 a worm wheel 28, which in turn is engaged by a worm 29 on a countershaft 30, which latter has bearings 31 housed in an appropriate enlargement 32 of the spider 3, and this shaft passes through one side of one leg of the spider beyond the frame of the machine and is provided at the corresponding end with another bearing 33 between which and the first named bearings 31 the counter-shaft carries a pulley 34 and a clutch 35, which latter may be of any appropriate construction, whereby the pulley 34 and the shaft 30 may be coupled together or uncoupled at will. For this purpose there is provided a lever 36 mounted on a support 37 close to the clutch, and the lever is connected by a link or rod 38 to a pedal 39 in position to be readily reached by the foot of an operator when appropriately positioned with reference to the machine as a whole, to move the clutch either way.

The spider 3 carries an annular drip pan 40 about the bearing head 18, and this drip pan is provided with a drain cock 41, the purpose of the drip pan appearing hereinafter.

Secured to the shaft 12 between its bearings are spiders 42, 43 and 44, respectively, the said spiders being spaced along the shaft at appropriate distances apart. The spiders 42 and 44 have about the same radial extent, while the spider 43 is of less radial extent than the others.

The spider 42 is provided at the periphery with a circular series of radial arms 45, each of which has bosses 46, 47 formed thereon with passages therethrough in radial relation to the axis of rotation of the shaft 12. The spider 43 has a peripheral series of bosses 48 each provided with a passage in line with the passage through a respective boss 47. The spider 44 terminates in a peripheral ring 49 through which there is formed a circular series of passages 50 in line with the passages through the bosses 46 and provided for a purpose which will presently appear. In each passage 50 there is seated an elongated member 51 having therein a longitudinally disposed chamber 52. This member 51 has one end 53 closed except as hereinafter described, and near the other end the member 51 is thickened to seat in the passage 50, while beyond the passage 50 in engagement with the face of the peripheral ring 49 constituting the upper face in the installed machine the member 51 is expanded laterally to form a ledge 54 seating on the upper face of the ring 49. The member 51 is extended longitudinally beyond the ledge 54, as indicated at 55, while within the extension 55 and the ledge 54 the internal bore of the member 51 is expanded, and where meeting the chamber 52, forms an annular ledge 56 upon which is seated a ring 57 designed to receive and support packing 58 held within the extension 55 by a packing gland 59. The chamber 52 is entered through the packing and packing gland by a pipe or tube 60 opening freely into the chamber 52 at what constitutes the lower end of the pipe in the installed machine. On that portion of the pipe or tube 60 above the packing gland 59 there is applied a split collar 61 having adjacent wings 62 traversed by a clamp bolt or screw 63, so that the collar may be loosened for adjustment along the pipe or tube 60 and may be securely fastened to the tube in any desired adjusted position for a purpose which will hereinafter appear.

Extending through the alined passages in matching bosses 47 and 48 are rods 64 each capable of sliding longitudinally through the bearings provided by the bosses 47 and 48. Mounted in each boss 46 is another rod 65 also capable of sliding longitudinally through the boss. Each pair of rods 64 and 65 in radial relation one to the other are joined together by a connector 66 having eyes 67 through which the respective rods are passed, and to which these rods are secured by pins 68 extending through the eyes and rods, so that the rods must of necessity move together. The eye 67 of each connector 66 through which extends the rod 65 has projecting therefrom a pin 69 in the form of a screw with a smooth shank, and mounted on the smooth shank of the screw is a roller 70 confined to the respective connector 66 by the head of the screw. Each roller 70 is adapted to engage the cam ring 5 by underriding the flange 7 throughout the greater portion of its length, and riding on the track 8 during a portion of the travel of the roller with reference to the cam.

Each rod 65 extends below the respective eye 67 and at the lower end carries a laterally expanded head 71 capable of sliding along the rod for a limited distance, this distance being determined in one direction by a pin 72 traversing the rod 65 and normally lodged within a cavity 73 formed in the corresponding end of the head 71. The other limit of travel of the head 71 on the rod is determined by a shoulder 74 formed on said rod. The head 71 is held normally in engagement with the pin 72 by a spring 75 surrounding the rod 65 between the boss 67 and the corresponding end of the head 71. Each rod 64 also extends an appropriate distance below the corresponding boss 48 of the spider 43 and at the lower end this rod carries a set collar 76. Between the collar 76 and the corresponding boss 48 the rod 64 is surrounded by a sleeve 77 from one side of which there projects a shelf 78, and between the sleeve 77 and the set collar 76 the rod 64 is surrounded by a spring 79 tending normally to hold the sleeve 77 away from the collar 76, but yielding to superior pressure.

Each shelf 78 is in the normal operation of the machine practically horizontal and extends radially outward from the rod 64. This shelf has formed through it a passage 80 expanding from the lower face of the shelf toward the upper face by successive steps forming shoulders 81, 82, respectively. The shoulder 81 is designed to support a closure 83 for the passage, which closure is axially recessed to receive the upper end of the pipe 60 and on the upper face the closure 83, which is in the form of a circular plate, has an upstanding boss 84 surrounded by an annular recess 85, which latter is designed to receive a ring 86 of some compressible material, such as soft vulcanized rubber. Extending through the closure or plate 83 and the boss 84 is a circular series of passages 87 together with another passage central thereto. Extending through the central passage is a tube 88 of small diameter joined to another tube 89 of larger diameter in line and communicating therewith. The tubes 88 and 89 are in the center line or axis of the tube 60 or approximately so, and the tube 89 at its lower end is fast to and extends through a threaded sleeve 90 extending into the chamber 52 through the end 53 of the member 51 and exterior to the end 53 the sleeve 90 is provided with a terminal portion 91 preferably in the form of a hexagonal nut for the application of a manipulating tool such as a wrench, while the sleeve on its threaded portion is also provided with another nut 92 designed to force a washer 93 against the lower face of the end 53, which may be suitably shaped for the purpose, thus not only holding the sleeve 90 in adjusted positions, but also serving to hermetically close the passage traversed by the sleeve 90. The tube 89 terminates outside the sleeve 90 below the lower end of the same in position to discharge into the pan 40, and the tube 89 beyond the nut 91 need, therefore, be of but short length.

The ledge 82 of each shelf 78 is designed to receive a can 94 having formed centrally in one head a minute perforation 95, which, when the can is placed upon the ledge 82 and centered by the peripheral wall of the corresponding portion of the passage 80, is in line with the tube 88, so that the latter may enter the can through the passage or perforation 95 to an appropriate extent. The ledge 82 is of a diameter to receive and center the largest can the machine is to fill, while for smaller cans a reducing ring may be used, but as this is a common expedient it is not deemed necessary to illustrate it.

The rollers 70 in traveling about the cam are raised and lowered throughout the section 6 of the cam and maintained in the lowered position throughout the greater portion of the length of the cam, at such time underriding the flange 7, the expressions of direction as used both with respect to the rise and fall of the rollers and to the movements of other parts of the machine, as well as the expressions of position with respect to the parts of the machine being employed with reference to the machine as installed in operative position upon a substantially level support.

The rollers travel bodily about the axis of the shaft 12, to which latter motion is imparted at the will of the operator by the shaft 30 through the worm 29 and worm gear wheel 28, the shaft 30 in turn receiving motion from any suitable source of power. The webs 42, 43 and 44, as well as the parts carried thereby participate in the rotative motion of the shaft 12.

Considering a single can filling unit of a machine, let it be assumed that the roller 70 belonging to such unit is at the highest portion of the cam 5. Under these circumstances the rods 64 and 65 are raised to their highest points of travel with the connector 66 close to or in actual contact with the bosses 46 and 47 of the web 42, although actual contact is not necessary. The head 71 is correspondingly raised, but is in contact with the pin 72 by the action of the spring 75. Moreover, the sleeve 77 is carried by the rod 64 into contact with the corresponding boss 48 of the web 43 and this position is reached before the rod 64 has been fully elevated, so that the spring 79 is compressed by the collar 76 against the under end of the sleeve 77. The lifting of the shelf 78 with the sleeve 77 has caused a corresponding lifting of the pipe 60 which is therefore drawn to a commensurate extent out of the member 51, the tube 60 operating after the manner of a piston, but the lower end of the tube 60 does not pass out of the chamber 52. In this position of the parts the tube 88 has its upper end at or below the upper margin of the ring 86 and at or slightly above the upper edge of the boss 84 and is maintained concentric with the margins of the ledge 82 by the boss 84.

Let it be further assumed that milk has been supplied through the shaft 12 into the distributing chamber, and from thence through the pipes 26 which are each connected to a valve 96, and the latter is connected by a pipe 97 to the lower end of the chamber 51, the pipe 97 including a union 98 for the ready dismantling of the structure. Each valve 96 has its stem 99 provided with a cross piece 100 in the path of which at appropriate points are stop pins 101 and 102, respectively, one pin engaging the cross piece 100 to open the valve and the other pin engaging the cross piece 100 in a manner to close the valve.

Under the conditions assumed with respect to the one filling unit the operation of which will be described through one cycle, the roller 70 is in the progressive rotation of the structure caused to pass down the descending side of the cam track. This will cause a like descending movement of the rods 64 and 65, but before the descending movement is begun it is assumed that a can 94 has been placed on the ledge 82 which centers the can on the shelf 78 and the can is so placed that the perforation 95 is lowermost and immediately above the upper end of the tube 88 in line with the latter. The placing of the can on the ledge may be by hand or by any suitable automatic mechanism which it is not deemed necessary to show.

Since the spring 79 is compressed when the roller 70 is in its highest position, the rod 64 will move downwardly for a considerable distance before the compression of the spring 79 is sufficiently released to permit the shelf 78 to descend by its own weight. Before this position is reached, however, the cap 71 is brought into engagement with the then upper end of the can 94, this end of the can being that remote from the filling opening 95. The spring 75 will yield to permit the rod 65 to move a short distance with relation to the cap 71, so that the said cap 71 engages the can with considerable pressure due to the force of the spring 75. Before the shoulder 74 reaches the cap, the latter is moved positively and the can 94 participates in this positive movement transmitting the motion to the shelf 78 even though the spring 79 be under some compression. The friction of the pipe 60 in the packing through which it enters the chambers 52 will cause a resistance to the motion of the pipe and consequently the shelf 78 will move to some extent independently of the pipe, and as the latter is connected to the plate 83 the said plate together with the ring 84 will not move to any extent during the initial movement of the shelf 78, so that the can 94 is brought into contact with the ring 86 about the perforation 95 and the ring 86 being of elastic material is compressed against the outer wall of the head of the can, thus sealing the same about the perforation 95 and then the pipe 60 participates in the further downward movement of the shelf 78. However, the tube 88 is held against any downward movement and consequently the can 94 is moved along the tube 88 which enters the perforation 95 until the upper end of the tube 88 is in close relation to the inner wall of the then upper end of the can, the extent of entrance of the tube 88 into the can being determined by the position of the collar 85 on the pipe 60, this collar ultimately coming into contact with the gland 59, thus arresting further downward movement of the pipe 60 and of the can 94 except that there may be a further slight compression of the ring 86. The spring 75 is sufficiently strong to hold the can 94 against the ring or gasket 86 with such pressure as to render the joint between the gasket and can fluid tight, but the spring 75 will yield sufficiently to compensate for any variations in the construction of the apparatus or in the cans. The shelf 78 is held against the can by the spring 79, which spring may be so related to the other parts of the machine as to not be fully extended under the circumstances assumed.

By the time the parts have reached the position just described, the roller 70 is traveling under the flange 7 where the latter is level, and the parts are therefore held in the lowered position. By the time this lowered position has been reached the appropriate pin 101 or 102, in accordance with the direction of rotation of the machine, engages the cross piece 100 of the valve 96 belonging to the unit under consideration and the pipe 26 coming from the distribution chamber is opened to the pipe 97, wherefore milk from the distribution chamber where it is under pressure flows into the chamber 52 and thence through the pipe 60 to the passages 87 to the interior of the ring or gasket 86 and from thence through the perforation 95 about the tube 88 into the can 94. Milk quickly accumulates within the can, and since the entering stream of milk is passing through what is then the bottom of the can by way of the perforation 95, the incoming milk stream must flow through the accumulating body of milk within the can and consequently the milk stream is diverted and distributed through the body of milk, wherefore any tendency of the milk to pass toward the other end of the can in the form of a jet is prevented and foaming of the milk is wholly obviated, the apparatus of the present invention in this respect operating in the same manner as the apparatus disclosed in the aforesaid application No. 634,052.

The milk entering into the can of course compresses the air within the can, which latter finds ready escape through the tube 88, the open end of which tube is close to the inner face of the upper end of the can, and the air passes out through the tube 88 into the tube 89 and from the lower end of the latter to the atmosphere. During all this time the shaft 12 of the filling unit under consideration is rotating and ultimately the valve 96 has its cross piece 100 brought into contact with the other stop pin 101 or 102, as the case may be, when the valve is closed, so that there is no further flow of milk into the chamber 52. At about this time the roller 70 has reached the rising portion of the cam 5 and the rods 64 and 65 are beginning to rise. It is preferable that the operator have some visible indication that the cans being filled have been filled to the desired limit, and, therefore, the parts are so timed that the inflowing milk will fill the cans until the upper end of the tube 88 is overflowed, wherefore milk will pass through the tube 88 into the tube 89 and from the lower open end thereof, being caught in the pan 40 provided for the purpose, this pan being of sufficient extent to underride the lower ends of all the tubes 89 throughout their path of travel.

As the rods 64 and 65 rise the spring 79 lifts the shelf 78 with it and the drag of the packing of the pipe 60 will hold the latter until the plate 83 becomes seated on the ledge 81, whereby causing the ring or gasket 86 to move just out of engagement with the corresponding head of the can 94. Then the pipe 60 rises with the shelf 78 and the withdrawal of the pipe 60 in part from the chamber 52 creates a partial vacuum therein, so that this vacuum causes an inrush of air around the edges of the can where resting on the ledge 82 and between the outer face of the then lower end of the can and the adjacent edge of the gasket 86, wherefore any accumulaton of milk within the gasket 86 and on the outer face of the can head is drawn off by the onrush of air. This continues until the shelf 78 is raised to the highest point when the sleeve 77 contacts with the boss 48 by which time the tube 88 has become housed in the pipe 60 to the full extent designed and any slight drop of milk which would otherwise lodge at the opening 95 is also drawn into the tube 60 by the inrush of air. After the rising movement of the shelf 78 has ceased the rods 64 and 65 still continue their upward movement and ultimately the pin 72 engages a head 71, and the latter is lifted from the filled can 94 to a sufficient extent to permit the operator to lift the filled can from the shelf 78 and to replace it with an empty can, the movement of the rotary parts of the machine being sufficiently slow to permit these actions of the operator, or the filled cans may be removed and replaced by empty cans by any suitable automatic mechanism. No milk will spontaneously escape from the inverted can after the tube 88 has been withdrawn therefrom and before the can is removed from the shelf 78, since the perforation 95 is to all practical purposes capillary. Furthermore, there still remains milk within the tube 88 since milk passes into this tube during the final stage of filling, so as to give evidence by the outflow of milk from the tube 89 that the can has been properly filled.

The tube 88 is necessarily of smaller diameter and, therefore, quite weak and not adapted to withstand any material pressures tending to bend it. The tube 88 is greatly strengthened by the comparatively large tube 89 so far as the end of the tube 88 connected to the end of the tube 89 is concerned. However, the free end of the tube 88 is sustained by the plate 83 where traversed by the tube 88 and even if the tube 88 becomes bent from any reason it readily enters the perforation 95, since the latter when the can is in place on the shelf 78 is closely adjacent to the corresponding end of the tube 88 and in fact too close to be affected by any bend in the said tube 88. It is immaterial whether the tube 88 bends after entering the can or not, since it will readily straighten when being again housed in the pipe 60.

The machine is adapted to fill cans of different capacities, and as cans of different capacities vary in height but should be filled to approximately the same extent it is necessary to provide for the entrance of the tube 88 into cans of different heights to the same relative extent. For this purpose the adjustable collar 61 is provided. Suppose that the cans 94 to be filled are half the height of that indicated in the drawings. The head 71 would then be lowered to a considerably greater extent than in the particular showing of the drawings before engaging the can, wherefore the shelf 78 is not lowered by the engagement of the head 71 with the can until a later period in the cycle of operations than under the conditions shown in the drawings, so that the pipe 60 would not be forced into the chamber 52 to so great an extent as before and in order that the pipe 60 may be stopped at the proper point to cause the gasket 86 to be compressed tightly against the can the collar 61 is adjusted lower down on the pipe 60 to provide for the difference in movement of the table 78.

The cycle of operations described with reference to a chosen one of the can filling units occurs with each can filling unit in succession and the number of separate units in the machine is in accordance with the time taken to fill the cans. With small cans the machine may be run more rapidly than with large cans. When the supply pressure is maintained, or if the machine be run at the same speed whether the cans be large or small the pressure necessary to cause the filling may be less with small cans than in the case of large cans.

In order that there may be no flow of milk should there be a failure to place an empty can on any of the tables 78, any suitable device may be employed to avoid opening the valves 96 except when the respective cans are properly in place. A mechanism for the purpose is shown in the before-mentioned application No. 634,052, and such mechanism or any other suitable mechanism may be used in connection with the present invention.

The process of canning liquids herein disclosed but not claimed, is described and claimed in my copending application Serial No. 669,886, filed on January 6, 1912, for process of canning liquids.

What is claimed is:—

1. In an apparatus for filling liquid into cans each of which is provided with a small filling perforation, a carrier for the can for supporting the same in the inverted position with the perforation downward, means for directing liquid into the can when on the carrier, and an air tube of a size to enter the can through the small perforation to a point adjacent the imperforate end of the can when on the carrier, those ends of both the air tube and liquid directing means remote from the can being in normally fixed relation one to the other, and the can carrier and that end of the liquid directing means adjacent thereto being movable lengthwise of the air tube to an extent to cause the introduction of the tube into the can and its total wihdrawal therefrom in accordance with the direction of movement of the can support.

2. In a machine for filling cans with liquid through a single small perforation in each can while the can is inverted with the perforation downward, a telescoping liquid directing tube provided with sealing means for engaging the perforated end of the can about the perforation, and an air tube extending through the liquid directing tube and of a length and diameter to enter a can through the small perforation therein to a point adjacent the imperforate end of the can.

3. A machine for filling cans with liquid through a small filling perforation in one end of each can when the can is inverted with the filling perforation downward, comprising a liquid directing tube formed of two members in telescoping relation one to the other, one member being provided with means for engaging the perforated end of the can about said perforation in sealing relation thereto, and an air tube carried by the other end of the liquid directing tube and of a length to enter a can engaged by the first named portion of the liquid directing tube when said portion of the liquid directing tube is telescoping upon that portion of the tube carrying the air tube.

4. In a machine for filling liquid into cans each of which is provided with a single small filling perforation and during the filling operation is located with the perforation downward, a support for the inverted can, a telescoping liquid directing tube having a movable member extending through the support and provided with sealing means at the end extending through said support to engage a can about the perforation, an air tube carried by the relatively fixed portion of the liquid directing tube and of a length and diameter to enter a can through the small perforation to a point adjacent the imperforate end thereof when on the support, and means for causing a movement of the can into sealing relation to the movable portion of the liquid directing tube and for then telescoping said portion of the tube into the relatively fixed part thereof.

5. In a machine for filling liquid into cans each of which is provided with a single small filling perforation and during the filling operation is located with the perforation downward, a support for the inverted can, a telescoping liquid directing tube having a movable member extending through the support and provided with sealing means at the end extending through said support to engage a can about the perforation, an air tube carried by the relatively fixed portion of the liquid directing tube and of a length and diameter to enter a can through the small perforation to a point adjacent the imperforate end thereof when on the support, and means for causing a movement of the can into sealing relation to the movable portion of the liquid directing tube and for then telescoping said portion of the tube into the relatively fixed part thereof, the machine being provided with means for causing the flow of liquid through the liquid directing means and into the can when the air tube is within the can and the latter is in sealed relation to the corresponding end of the liquid directing means.

6. In a machine for filling liquid into cans each with a small filling perforation in one end and otherwise sealed, a support for sustaining the can in the inverted position with the perforation downward, a telescoping liquid directing tube extending through and having a limited movement independent of the support, said support and portion of the tube carried thereby having an extent of movement with respect to the remaining portion of the tube, and an air tube extending through the liquid directing tube and carried by the relatively fixed part of the liquid directing tube.

7. In a machine for filling liquid into cans each with a small filling perforation in one end and otherwise sealed, a support for sustaining the can in the inverted position with the perforation downward, a telescoping liquid directing tube extending through and having a limited movement independent of the support, said support and portion of the tube carried thereby having an extent of movement with respect to the remaining portion of the tube, and an air tube extending through the liquid directing tube and carried by the relatively fixed part of the liquid directing tube, the air tube having means for its adjustment lengthwise of the liquid directing tube, and the movable portion of the liquid directing tube having means for determining the extent of its limited movement with reference to the can support.

8. In an apparatus for filling cans, each of which is provided with a single small filling perforation at one end and with the other end imperforate, said perforation being of a size to prevent spontaneous outflow of liquid therethrough when the filled can is inverted, a movable support for the can for sustaining the latter in an inverted position with the perforated end downward, a filling tube movable with the can support and having a limited extent of movement independent of the can support, sealing means carried by the filling tube for hermetically connecting the tube to the can about the filling perforation, and an air tube fixed with relation to the filling tube and can support and extending through the filling tube, the air tube being of a length to enter the can toward the imperforate end thereof to the level to which the can is to be filled when the can support and filling tube are moved lengthwise of the air tube.

9. In an apparatus for filling cans each provided with a single small filling perforation at one end and the other end imperforate, said perforation being of a size to prevent spontaneous outflow of liquid therethrough when the filled can is inverted, a movable support for sustaining the can in an inverted position with the perforated end downward, a filling tube or pipe carried at one end by the support and having a sealing means at the end carried by the support, said filling tube or pipe having a limited range of movement independent of the support, a clamping means for the can for moving the latter and its support together with the filling pipe or tube, and an air tube extending through the filling tube lengthwise of the latter and of a length to enter the can through the perforated end thereof toward the other end to the level to which the can is filled, the air tube being fixed against participation in the movement of the filling tube or pipe and the can support.

10. In an apparatus for filling cans each having a single filling perforation at one end with a can when being filled in an inverted position, a slidable rod, a table carried thereby and movable along the rod, a spring on the rod sustaining the table, said table being provided with a passage therethrough having a seat for receiving the can in the inverted position, a filling tube or pipe carried by the table and having a limited movement with relation to the table in the direction of the length of the filling tube or pipe, said filling tube or pipe at the table end being provided with a sealing gasket and opening interior to said gasket, a material conduit into which the material pipe or tube is movable to different extents, an air tube extending through the material conduit and the pipe or tube entering the latter, the air tube having a terminal portion of a length to enter a can on the table through the filling perforation toward the imperforate end of the can to the level to which the can is to be filled, the air tube and material conduit into which the material pipe or tube enters being fixed against participation in the movements of the table and pipe or tube carried thereby, a clamp for engaging the imperforate end of the can to hold the latter to the table, and means for causing reciprocation of the clamp and the rod carrying the table.

11. An apparatus for filling cans with milk or the like where each can is provided with a single small filling perforation in one end, a rotatable hollow shaft constituting a milk conduit and including a distributing chamber, a circular series of milk receiving members, conduits leading from the distributing chamber to the milk receiving members and each including a valve, means for opening and closing the valves at predetermined intervals, a support carried by the shaft and in turn carrying the milk receiving members and participating with the latter in the rotary movement of the shaft, other supports carried by the shaft, a circular series of rods carried by the said other supports and movable therein in the direction of their lengths, a table carried by each rod and provided with a passage therethrough having a seat for a can when placed thereon in the inverted position, a milk pipe or conduit carried by each table and entering a corresponding milk receiving member connected to the distributing chamber, a spring support on each rod for the corresponding table, a stop member on each milk pipe entering a respective milk receiving member for determining the extent of movement of the milk pipe into said milk receiving member, said milk pipe being provided within a respective table with a ring or gasket of compressible material for engaging a can and sealing the pipe thereagainst, said pipe opening within the ring, an air tube extending through the milk receiving member and through the milk pipe substantially concentric therewith and with the sealing ring or gasket, said air tube being of a length to enter a can through the small perforation therein toward the other end of the can to the level to which the can is to be filled, a clamp member for each can in position to engage the end thereof remote from the filling perforation when the can is on the table, a cam track, and means engaging the cam track and each controlling a rod carrying a respective table and clamp head for moving the clamp head into engagement with a can and then moving the can and table together with the milk pipe carried by the table toward the milk receiving member connected to the distributing chamber, the air pipe being fixed against participation in the movements of the can, table and milk pipe under the action of the can.

12. In an apparatus for filling cans each with a single small filling perforation in one end of a size to prevent spontaneous outflow of liquid therefrom when the filled can is inverted, a support for sustaining the can in the inverted position, a liquid directing pipe or duct adapted to engage a can upon the support about the filling perforation of the inverted can in sealing relation thereto, said pipe or duct having a movement toward and from the can into and out of sealing relation thereto while the can is on the support, and an air tube extending through the liquid directing pipe or duct and of a length and diameter to enter the can through the small filling perforation to a point adjacent the imperforate end of the can, the can support and liquid directing tube having an extent of movement along the air tube to cause the introduction of the air tube into the can to a point adjacent the imperforate end thereof and the total withdrawal of the air tube from the can, the said can support having a greater extent of movement in the direction of the length of the air tube than the liquid directing tube.

13. In an apparatus for filling cans each with a single small filling perforation in one end of a size to prevent spontaneous outflow of liquid therethrough when the filled can is inverted, a milk pipe or duct adapted to engage a can about the filling perforation when the can is in the inverted position, and an air tube extending through the milk pipe and of a length and diameter to enter the can through the small filling perforation to a point adjacent the imperforate end of the can, the milk pipe being movable lengthwise of the air tube to an extent corresponding to the extent of entrance of the air tube into the can, and the milk pipe being provided with an adjustable stop member for determining its extent of movement with reference to the air tube.

14. In an apparatus for filling cans with milk or the like, a milk receiving member having a chamber therein, a milk pipe movable in a direction into and out of the milk receiving chamber, a can support carrying the milk pipe and movable therewith, and an air tube carried by the milk receiving member and of a length to enter a can engaged by the milk pipe to the level to which the can is to be filled on the movement of the milk pipe into the milk receiving chamber.

15. In an apparatus for filling milk or the like into cans through a single small perforation in the latter when the cans are in an inverted position, a milk receiving member having a chamber therein and provided with a packing gland at one end, a pipe entering the milk receiving chamber through the packing gland and provided at the end exterior to the milk receiving chamber with a laterally expanded member having passages therethrough communicating with the corresponding end of the milk pipe, a packing ring or gasket carried by the laterally expanded member about the passages therethrough, a table carrying the milk pipe by the expanded member and provided with a seat for receiving a can in an inverted position with the perforation in the can substantially central to the packing ring or gasket, an air tube mounted in and extending lengthwise through the milk receiving member and having a terminal portion extending through the laterally expanded member at the corresponding end of the milk pipe, and means for moving the table and milk pipe with reference to the milk receiving member, the air tube being held by the milk receiving member against participation in the movements of the milk pipe and table.

16. In an apparatus for filling milk or the like into cans through a single small perforation in the latter when the cans are in an inverted position, a milk receiving member having a chamber therein and provided with a packing gland at one end, a pipe entering the milk receiving chamber through the packing gland and provided at the end exterior to the milk receiving chamber with a laterally expanded member having passages therethrough communicating with the corresponding end of the milk pipe, a packing ring or gasket carried by the laterally expanded member about the passages therethrough, a table carrying the milk pipe by the expanded member and provided with a seat for receiving a can in an inverted position with the perforation on the can substantially central to the packing ring or gasket, an air tube mounted in and extending lengthwise through the milk receiving member and having a terminal portion extending through the laterally expanded member at the corresponding end of the milk pipe, and means for moving the table and milk pipe with reference to the milk receiving member, the air tube being held by the milk receiving member against participation in the movements of the milk pipe and table, the air tube being provided with means for its adjustment lengthwise of the milk receiving member and the milk pipe being provided with means for limiting its movements into and out of the milk receiving member to predetermined extents.

17. In an apparatus for filling cans with milk or the like through a small perforation in one end of each can of a size to prevent spontaneous outflow of liquid therethrough when the filled can is inverted, the filling being performed while the can is in an inverted position, a reciprocable milk tube or pipe having means for engaging a can about the small perforation to direct milk into the can through said perforation, and an air tube of smaller diameter than the diameter of the perforation to but partially fill the latter and movable into and out of the can through said perforation, the milk pipe having at the discharge end adjacent the can a guide for the air tube and the air tube being fixed against participation in the reciprocatory movement of the milk pipe.

18. In an apparatus for filling cans with milk or the like through a single small perforation in each can of a size to prevent spontaneous outflow of milk from the filled can when inverted and the filling being performed when the can is in an inverted position, a reciprocable milk pipe having means for engaging a can about the small filling perforation for directing milk therethrough into the can, and an air tube fixed against participation in the reciprocatory movement of the milk pipe, said air tube extending through the milk pipe and having a terminal portion of reduced diameter of a length and diameter to enter the can through the filling perforation to the level to which the can is to be filled, the milk pipe having at the discharge end a guide for the reduced portion of the air tube.

19. In an apparatus for filling cans while in the inverted position each through a small filling perforation in the then lower end of the can, an air tube movable into and out of the can while in the inverted position, the air tube entering the can through the filling perforation toward the other end of the can to the level to which the can is to be filled, and a milk pipe or conduit movable along the air tube to an extent to cause the latter to enter the can to the level to which the can is to be filled and to wholly withdraw from the can, the milk pipe being provided with a sealing gasket at the discharge end to engage the can about the filling perforation, and means for supporting the can in position to receive the material to be filled, said can support moving with the milk pipe and having a movement independent of the milk pipe to cause the gasket to unseal the connection with the can to permit inflow of air along the face of the can adjacent the filling orifice toward the milk pipe.

20. In an apparatus for filling cans through a small perforation in one end of each can, a support for the perforated end of the can provided with means for hermetically sealing the end of the can about the perforation when the can is on the support in an inverted position, a conduit for the material to be filled into the can leading to said perforation through the can support, and an air tube also leading to and of a length to enter the can through said perforation to the level to which the can is to be filled, said air tube passing through the can support and the said conduit, the can and its support being movable with the conduit along the air tube in the direction of the length of the latter to an extent to permit the full insertion of the tube into and its full withdrawal from the can.

21. In an apparatus for filling cans through a single small perforation in one end of each can, a support for sustaining a can in an inverted position with the perforation downward, a filling tube for the can leading through the can support to a point adjacent the perforation when the can is on the support, but terminating exterior to the can, and an air tube interior to the filling tube and of a length to extend through the can support and the perforation and into the can toward the imperforate end thereof to substantially the level to which the can is to be filled, said air tube being maintained in a fixed position, and the can support and filling tube being movable along the air tube to an extent permitting the full insertion of the tube into the can and its full withdrawal from the can.

22. In an apparatus for filling cans each having a small filling perforation at one end with the cans, when being filled, in an inverted position, a slidable rod, a table carried thereby and movable along the rod, a spring on the rod sustaining the table, said table being provided with a passage therethrough having a seat for receiving the can in the inverted position, a filling tube or pipe carried by the table and having a limited movement with relation to the table in the direction of the length of the filling tube or pipe, an air tube extending through the filling tube and having a terminal portion of a length to enter a can while on the table through the filling perforation toward the imperforate end of the can to the level to which the can is to be filled, the air tube being fixed against participation in the movements of the table and the filling pipe or tube carried thereby, a clamp for engaging the imperforate end of the can to hold the latter to the table, and means for causing simultaneous reciprocation of the clamp and the rod carrying the table.

23. In an apparatus for filling cans, a telescoping duct for the material to be filled into the cans, a can support for receiving a can in an inverted position and carrying one member of the telescoping duct, a clamp member for engaging the end of a can upon the can support remote from the end resting on the can support, means for actuating the clamp member to engage the can and move the latter together with its support and the member of the telescoping conduit connected to the support, a rod fixed to the means for moving the clamp member and in turn carrying the cam support, and a spring on the rod constituting a yielding connection between the rod and the can support for permitting independent movement of the rod and can support one with relation to the other.

24. In an apparatus for filling cans when in an inverted position, a can support, a material duct connected to said can support, a clamp head for engaging the end of a can remote from the support, a rod carrying the clamp head, means for imparting reciprocatory movement to the rod to move the can and its support for a distance substantially that of the depth of material to be filled into the can, another rod connected to the first named rod for movement simultaneously therewith, said second named rod constituting a carrier for the can support, and a spring connection between the second named rod and the can support for permitting the rod to move independently of the can support.

25. In an apparatus for filling cans while in an inverted position each through a small filling perforation in the then lower end of the can, a support for the can having a range of movement substantially equal to the depth to which material is to be filled into the can, a material directing pipe or tube movable with the can support, and a sealing gasket carried by the material pipe or tube in position to engage the filling end of the can when on the can support, the material pipe or tube with the gasket having a limited range of movement independent of the can support to cause the withdrawal of the gasket from sealing relation with the can during the return movement of the can and its support to normal position.

26. In an apparatus for filling cans while in an inverted position each through a small filling perforation in the then lower end of the can, a support for the can, means for moving the support in the direction of the longitudinal axis of a can thereon to an extent substantially equal to the depth to which material is to be filled into the can, a material conduit movable with the support and having a limited movement independent of the support, said conduit being provided with means for engaging the filling end of a can when on the support to seal the can about the filling perforation, and an air tube fixed against participation in the movement of the can, said air tube being of a length to enter the can through the filling perforation to the level to which the can is to be filled when the can is moved in one direction and to be wholly withdrawn from the can when the latter is moved in the other direction, the limited independent movement of the material conduit with relation to the can support causing the unsealing of the can for the entrance of air thereat to the filling conduit on the return movement of the can and its support after the filling has been completed.

27. In an apparatus for filling cans each with a single small filling perforation in one end of a size to prevent spontaneous outflow of liquid therefrom when the filled can is inverted, a support for sustaining the can in the inverted position, a liquid directing pipe or duct adapted to engage a can upon the support about the filling perforation of the inverted can in sealing relation thereto, and an air tube of a length and diameter to enter the can through the small filling perforation to a point adjacent the imperforate end of the can, said air tube being relatively fixed and the can support and liquid directing tube having an extent of movement lengthwise of the air tube to cause the introduction of the latter into the can to the filling level and the total withdrawal of the air tube from the can.

28. In a machine for filling liquid into cans each with a small filling perforation in one end, a liquid directing tube adapted to engage the perforated end of the can in sealing relation therewith, and an air tube extending through the liquid directing tube, said air tube having a portion of a length and diameter to enter the can through the small perforation to a point adjacent the imperforate end thereof, and the remainder of the air tube being of larger diameter than the first named portion of the tube, the liquid directing tube being formed of two parts one of which is in telescoping relation to the other and said telescoping part being provided with a supporting guide for that portion of the air tube of smaller diameter.

In testimony, that I claim the foregoing as my own, I have hereto affixed my signature in the presence of two witnesses.

WALTER J. PHELPS.

Witnesses:
JOHN H. SIGGERS,
FRANCES PEYTON SMITH.